US012598428B2

(12) United States Patent
Naiki et al.

(10) Patent No.: US 12,598,428 B2
(45) Date of Patent: Apr. 7, 2026

(54) TRANSDUCER AND ELECTRONIC DEVICE

(71) Applicant: ROHM CO., LTD., Kyoto (JP)

(72) Inventors: Takashi Naiki, Kyoto (JP); Noriyuki Shimoji, Kyoto (JP); Tomohiro Date, Kyoto (JP); Kenji Gouda, Kyoto (JP); Yurina Amamoto, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 191 days.

(21) Appl. No.: 18/536,551

(22) Filed: Dec. 12, 2023

(65) Prior Publication Data

US 2024/0129673 A1 Apr. 18, 2024

Related U.S. Application Data

(63) Continuation of application No. PCT/JP2022/024013, filed on Jun. 15, 2022.

(30) Foreign Application Priority Data

Jun. 18, 2021 (JP) ................................ 2021-101437

(51) Int. Cl.
*H10N 30/20* (2023.01)
*H04R 1/28* (2006.01)
*H04R 17/00* (2006.01)

(52) U.S. Cl.
CPC ......... *H04R 17/005* (2013.01); *H04R 1/2811* (2013.01)

(58) Field of Classification Search
CPC ................ H04R 17/005; H04R 1/2811; B81B 2201/0271; H10N 30/20
USPC .................................................. 381/190–191
See application file for complete search history.

(56) References Cited

U.S. PATENT DOCUMENTS

2017/0124703 A1* 5/2017 Masuda .............. G01S 15/8997
2022/0040736 A1 2/2022 Umezawa et al.
2022/0040737 A1 2/2022 Ikeuchi et al.

FOREIGN PATENT DOCUMENTS

JP 2021-044762 A 3/2021
WO 2020/230358 A1 11/2020

OTHER PUBLICATIONS

International Search Report for PCT/JP2022/024013, mailed on Sep. 6, 2022.
Written Opinion of the International Searching Authority for PCT/JP2022/024013, mailed on Sep. 6, 2022.

* cited by examiner

*Primary Examiner* — George C Monikang
(74) *Attorney, Agent, or Firm* — Rabin & Berdo, P.C.

(57) ABSTRACT

A transducer includes: a film support portion; a vibration film that is connected to the film support portion and capable of displacing in a thickness direction; a base material having an opposed surface that is opposed to the vibration film; and a first piezoelectric element that is provided with a pair of electrodes and a piezoelectric film sandwiched between the pair of electrodes, and is arranged on the vibration film, in which the transducer maintains a pressure in a space between the base material and the vibration film so as to keep displacement of the vibration film within a certain range.

16 Claims, 10 Drawing Sheets

TRANSDUCER AND ELECTRONIC DEVICE

CROSS REFERENCE TO RELATED APPLICATIONS AND INCORPORATION BY REFERENCE

This is a continuation application (CA) of PCT Application No. PCT/JP2022/024013, filed on Jun. 15, 2022, which claims priority to Japan Patent Application No. P2021-101437 filed on Jun. 18, 2021 and is based upon and claims the benefit of priority from prior Japanese Patent Application No. P2021-101437 filed on Jun. 18, 2021 and PCT Application No. PCT/JP2022/024013, filed on Jun. 15, 2022; the entire contents of each of which are incorporated herein by reference.

TECHNICAL FIELD

The present embodiment relates to a transducer and an electronic device.

BACKGROUND

Conventionally, transducers for transmitting or receiving sound waves or ultrasonic waves have been known. A transducer is used, for example, as a speaker for transmitting a sound wave, and is mounted on an earphone or a wearable terminal.

For example, Patent Literature 1 discloses a transducer suitable for an earphone. This transducer is formed with a lower through-hole penetrating in the plate thickness direction of a lower substrate, and is provided with at least a vibration film opposed to the lower through-hole by separating a lower space portion, and a piezoelectric element positioned on the vibration film.

DETAILED DESCRIPTION

Figure 1:
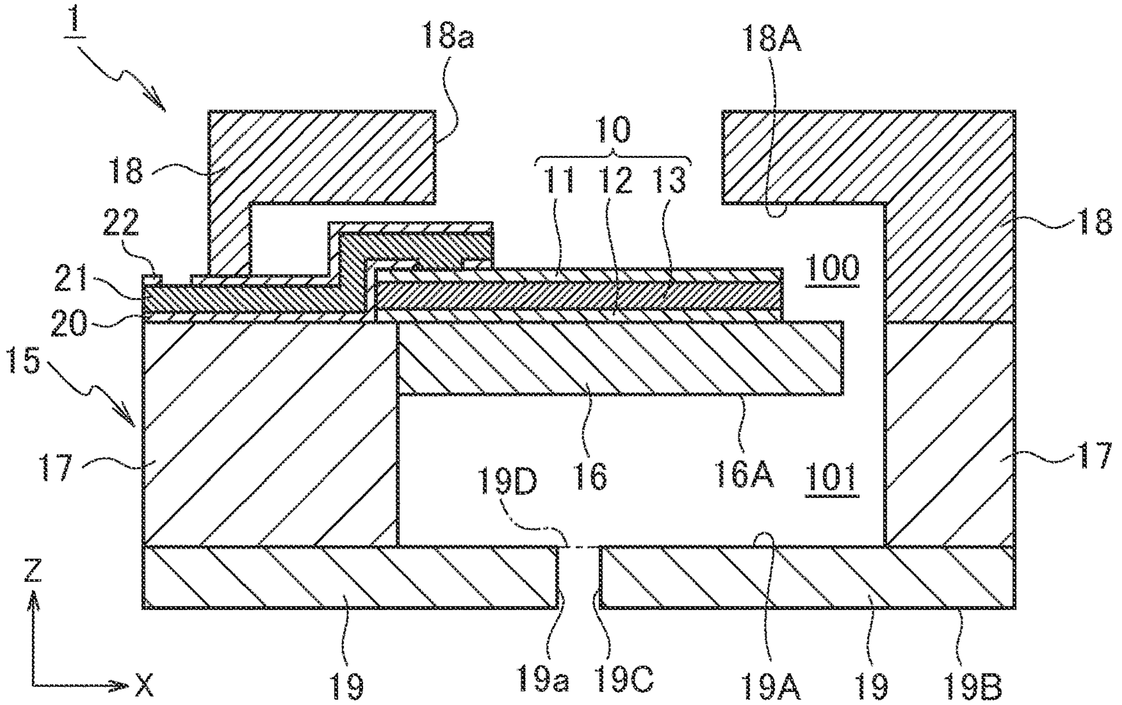
FIG. 1 is a cross-sectional view of a transducer according to a first embodiment in an X direction.

Next, the present embodiment will be described with reference to the drawings. In the drawings described below, the same or similar parts are denoted by the same or similar numerals. However, it should be noted that the drawings are schematic, and the relationships between the thickness of each component and the plane dimension, etc. are different from the actual ones. Accordingly, the specific thicknesses and dimensions should be determined in consideration of the following description. Further, it is needless to say that portions having different dimensional relationships and ratios are included among the drawings.

In addition, the following embodiments illustrate devices and methods for embodying technical ideas, and do not specify the material, shape, structure, arrangement, etc. of each component. Various modifications can be made to the present embodiments in the claims. In addition, the following embodiments illustrate devices and methods for materializing technical ideas, and do not specify the material, shape, structure, arrangement, etc. of each component. Various modifications may be made to the present embodiment within the scope of claims.

One specific aspect of the present embodiment is as follows.

<1>

A transducer includes: a film support portion; a vibration film that is connected to the film support portion and capable of displacing in a thickness direction; a base material having an opposed surface that is opposed to the vibration film; and a first piezoelectric element that is provided with a pair of electrodes and a piezoelectric film sandwiched between the pair of electrodes, and is arranged on the vibration film, in which the transducer maintains a pressure in a space between the base material and the vibration film so as to keep displacement of the vibration film within a certain range.

<2>

The transducer according to <1>, wherein in the opposed surface, a first total area of opening surfaces of all openings that penetrate the base material and face the space is 5% or less than a second total area of an entire region of a main surface of the vibration film that faces the space.

<3>

The transducer according to <1> or <2>, wherein in the opposed surface, the first total area of the opening surfaces of all the openings that penetrate the base material and face the space is 0.9 $mm^2$ or less.

<4>

The transducer according to any one of <1> to <3>, wherein the base material includes an opening, and further includes an opening member that surrounds the opening, in a main surface of the base material arranged on opposite side of the opposed surface.

<5>

The transducer according to <4>, wherein in a normal direction of the opposed surface, a distance between the opposed surface and a main surface of the opening member that is arranged on opposite side of a main surface in contact with the base material is longer than a diameter of a circle when the first total area is converted into an area of the circle.

<6>

The transducer according to <4> or <5>, wherein the opening member expands and contracts due to a change of air pressure in the space.

<7>

The transducer according to any one of <4> to <6>, wherein the opening member is made of resin.

<8>

The transducer according to any one of <4> to <7>, wherein the opening member is integrally formed with the base material.

<9>

The transducer according to any one of <1> to <8>, wherein the base material further includes a protrusion-like opening valve that is connected to a side wall surface of the opening in a normal direction of the opposed surface, and the first total area is changed by the opening valve.

<10>

The transducer according to <9>, further including a second piezoelectric element on the opening valve, wherein the second piezoelectric element has a function of changing the first total area by deforming the opening valve.

<11>

The transducer according to any one of <1> to <3>, wherein an entire region of the opposed surface overlaps the vibration film in a normal direction of the opposed surface, and a volume of the space is a product of 1.1 times a projected area of the vibration film and 1 to 100 times an amount of displacement by which the vibration film is displaced in the film thickness direction.

<12>

The transducer according to <11>, wherein a volume of the space is changed by displacement of the base material.

<13>

The transducer according to <11> or <12>, further including a third piezoelectric element on the base material and in the space, wherein the third piezoelectric element has a function of changing a volume of the space by deforming the base material.

<14>

The transducer according to any one of <1> to <13>, wherein the base material expands and contracts due to a change of air pressure in the space.

<15>

The transducer according to any one of <1> to <14>, wherein the base material is made of resin.

<16>

An electronic device including the transducer according to any one of <1> to <15>.

First Embodiment

<Transducer>

Figure 2:
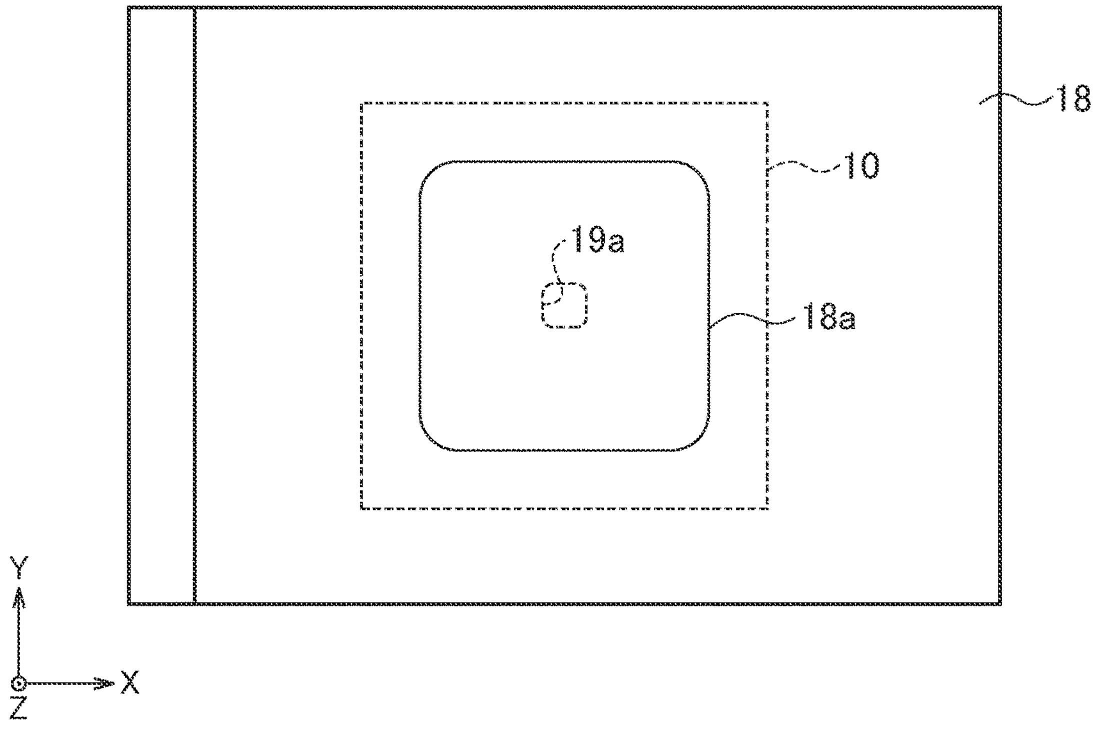
FIG. 2 is a top view of the transducer according to the first embodiment.

The configuration of a transducer 1 according to the present embodiment will be described with reference to FIGS. 1 and 2. FIG. 1 is a cross-sectional view of the transducer in the X direction. FIG. 2 is a top view of the transducer 1. The transducer 1 is mainly configured of a piezoelectric element 10, a film body 15, a contact member 18, and a base material 19. Specifically, the film body 15 is configured of a film support portion 17, and a vibration film 16 that is connected to the film support portion 17 and capable of displacing in the thickness direction. The base material 19 has an opposed surface 19A opposed to the vibration film 16. The piezoelectric element 10 is provided with a pair of electrodes 11 and 12, and a piezoelectric film 13 sandwiched between the pair of electrodes 11 and 12. The piezoelectric element 10 is arranged on the vibration film 16. The transducer 1 maintains the pressure in a space 101 between the base material 19 and the vibration film 16 so as to keep the displacement of the vibration film 16 within a certain range. In the following description, an up-and-down direction (Z direction) is defined with reference to the state of the transducer 1 illustrated in FIG. 1, but the direction in which the transducer 1 is used is not limited. In the present embodiment, the longitudinal direction of the base material 19 is defined as the X direction, and the short direction of the base material 19 is defined as the Y direction.

The pair of electrodes 11 and 12 and the piezoelectric film 13 have a shape corresponding to the shape of the vibration film 16 which will described later, and they have a square shape in the example illustrated in FIGS. 1 and 2.

Each of the electrodes 11 and 12 is formed using a thin film of a metal having conductivity, such as platinum, molybdenum, iridium, or titanium. One electrode 11 is positioned above the piezoelectric film 13, and is connected to an electrode pad which is a circuit pattern for applying a drive voltage to the electrode 11. The other electrode 12 is positioned below the piezoelectric film 13, and is connected to an electrode pad which is a circuit pattern for applying a drive voltage to the electrode 12.

The piezoelectric film 13 is made of, for example, lead zirconate titanate (PZT) film. The piezoelectric film 13 may be made of aluminum nitride (AlN), zinc oxide (ZnO), lead titanate ($PbTiO_3$), or the like, in addition to lead zirconate titanate.

An insulating film 20 is provided on part of the upper surface of the piezoelectric element 10, and the electrode 11 is connected to the wiring 21 through an opening provided in the insulating film 20. An insulating film 22 is provided on the wiring 21. The wiring 21 is electrically connected to an electrode pad (not illustrated) through an opening provided in the insulating film 22. That is, the electrode 11 is electrically connected to the electrode pad through the wiring 21. In the present specification, the term "electrically connected" includes being connected through "something having an electrical action". Here, "something having an electrical action" is not particularly limited as long as it enables the transmission and reception of electrical signals between the connection objects. For example, "something having an electrical action" includes electrodes, wiring, switching elements, resistive elements, inductors, capacitive elements, and the other elements having various functions.

The wiring 21 is formed by using, for example, a thin film such as a metal. The insulating films 20 and 22 may be, for example, aluminum oxide.

The film body 15 includes a vibration film 16 and a film support portion 17. The film body 15 is made of, for example, silicon (Si). The vibration film 16 and the film support portion 17 can be integrally formed by etching the back surface side of the film body 15 (the side on which the base material 19 is provided) in order to form the vibration film 16.

The vibration film 16 is made of a thin film, and is configured to be displaceable in the film thickness direction, that is, in the direction normal to the vibration film 16 (the up-and-down direction in the page space of FIG. 1: Z direction, and the direction perpendicular to the plane of FIG. 2: Z direction). The vibration film 16 has a main surface 16A facing the space 101 which will described later. The vibration film 16 has a substantially square shape when observed from a normal direction of a plane parallel to the vibration film 16.

The film support portion 17 has a rectangular cylindrical inner peripheral surface forming the space (cavity) 101. The vibration film 16 is inscribed on one side of the inner peripheral surface of the film support portion 17, and thus the vibration film 16 is supported by the film support portion 17. The vibration film 16 is connected to the upper end side of the film support portion 17.

The film support portion 17 includes a region overlapping the end of the piezoelectric element 10, and the vibration film 16 has a cantilever shape protruding from the film support portion 17. The distal end of the vibration film 16 is formed at a free end.

The base material 19 has the opposed surface 19A opposed to the vibration film 16, a main surface 19B arranged on the opposite side of the opposed surface 19A, and a side wall surface 19C between the opposed surface 19A and the main surface 19B. The base material 19 is also in contact with the film support portion 17 in the opposed surface 19A. The opposed surface 19A is provided with an opening 19*a* that penetrates the base material 19 and faces the space 101. The opposed surface 19A also includes an opening surface 19D of the opening 19*a* that faces the space 101. In the space 101 surrounded by the vibration film 16, the film support portion 17, and the base material 19, air vibrates due to the displacement of the vibration film 16, and air flows to the outside of the transducer 1 through the opening 19*a*. As illustrated in FIG. 2, it is preferable that the opening 19*a* has rounded ends. Since the opening 19*a* has such rounded ends, the concentration of stress at the ends can be alleviated. The base material 19 is composed of, for example, silicon (Si) and a printed board such as a printed wiring board (PWB) and a printed circuit board (PCB).

In the opposed surface 19A, when the total area of the opening surface 19D of the opening 19*a* facing the space 101 is 5% or less, more preferably 4% or less, and still more preferably 3% or less than the total area of the entire region of the main surface 16A of the vibration film 16 facing the space 101 (in other words, the total area of the opposed surface 19A of the base material 19, excluding the opening surface 19D, is 95% or more, more preferably 96% or more, and still more preferably 97% or more than the total area of the entire region of the main surface 16A of the vibration film 16 facing the space 101), the pressure in the space 101 is maintained within a certain range, thereby making it possible to ensure appropriate air flow. Specifically, when the vibration film 16 alternately repeats the displacement of the vibration film 16 to the upper space 100 side and the displacement of the vibration film 16 to the lower space 101 side, the pressure in the space 101 gradually increases, and the resonance of the vibration film 16 can be attenuated by an increase in the pressure in the space 101, and the air flow in the space 101 is also adjusted. Since the air in the space 101 flows to the outside from the opening 19*a*, the pressure in the space 101 has a maximum value, and the maximum value is appropriately set by the displacement amount and shape of the vibration film 16, the volume of the space 101, or the like. For this reason, the displacement of the vibration film 16 can be kept within a certain range.

Further, when the total area of the opening surface 19D of the opening 19*a* facing the space 101 is 0.9 $mm^2$ or less, more preferably 0.7 $mm^2$ or less, and still more preferably 0.5 $mm^2$ or less, the pressure in the space 101 is maintained within a certain range, thereby making it possible to ensure appropriate air flow. Specifically, when the vibration film 16 alternately repeats the displacement of the vibration film 16 to the upper space 100 side and the displacement of the vibration film 16 to the lower space 101 side, the pressure in the space 101 gradually increases, and the resonance of the vibration film 16 can be attenuated by an increase in the pressure in the space 101, and the air flow in the space 101 is also adjusted. Therefore, the displacement of the vibration film 16 can be kept within a certain range.

The contact member 18 is formed on the insulating film 22 and on the film support portion 17. The contact member 18 is arranged so as to be opposed to the vibration film 16. The contact member 18 has a function of controlling the displacement of the vibration film 16. That is, when the vibration film 16 is displaced toward the space 100, the contact member 18 controls the displacement of the vibration film 16 by the vibration film 16 or the piezoelectric element 10 arranged on the vibration film 16 coming into contact with the contact member 18.

The distance between a contact surface 18A of the contact member 18 with which the vibration film 16 comes into contact and the vibration film 16 is set, based on the displacement of the vibration film 16 acquired when a rated voltage is applied to the piezoelectric element 10 (hereinafter referred to as "maximum displacement"). That is, the contact surface 18A of the contact member 18 is set such that the vibration film 16 or the piezoelectric element 10 (a stack of these ones is also called a vibration body) comes into contact with the contact surface 18A when the displacement larger than the maximum displacement occurs. Thus, the vibration film 16 or the piezoelectric element 10 comes into contact with the contact surface 18A when a large displacement exceeding the maximum displacement occurs in the vibration body due to an impact or the like, without preventing the normal displacement of the vibration film 16 caused by the piezoelectric element 10.

The shape of the contact surface 18A is formed based on the displacement shape when the vibration film 16 is displaced. Thus, when the vibration film 16 comes into contact with the contact surface 18A, the contact surface 18A comes into contact with the vibration film 16 with the surface. For example, the contact surface 18A of the contact member 18 arranged in the space 100 may have a hemispherical shape that is curved upward. The contact member 18 is composed of, for example, silicon (Si).

An opening 18*a* is formed at the center of the contact member 18. In the space 100 between the vibration film 16 and the contact member 18, air vibrates due to the displacement of the vibration film 16, and the air flows to the outside of the transducer 1 through the opening 18*a*. When the air flows in the space 100, the distance (clearance) between the vibration film 16 and the contact surface 18A of the contact member 18 may be as long as the vibration film 16 can be displaced up and down, and is preferably small. For example, the clearance is 5 to 30 μm. By reducing the clearance, an air leakage can be suppressed, and thus air can be efficiently vibrated. As illustrated in FIG. 2, it is preferable that the opening 18*a* has rounded ends. Since the opening 18*a* has rounded ends, the concentration of stress at the ends can be alleviated.

In the transducer 1 having such a configuration, the piezoelectric element 10 is provided on the vibration film 16 of the film body 15. That is, the lower electrode 12, the piezoelectric film 13, and the upper electrode 11 are stacked in this order on the vibration film 16. When a drive voltage is applied to the pair of electrodes 11 and 12, a potential difference is generated between the pair of electrodes 11 and 12. The vibration film 16 is displaced by this potential difference. Specifically, the distal end side of the vibration film 16 is displaced so as to be warped.

By repeatedly applying a drive voltage to the pair of electrodes 11 and 12, the vibration film 16 alternately repeats displacement to the space 100 side, and displacement to the space 101 side. The air around the vibration film 16 is vibrated by the vibration of the vibration film 16, and the vibration of the air is output as a sound wave.

In the present embodiment, the transducer 1 maintains the pressure in the space 101 between the base material 19 and the vibration film 16 so as to keep the displacement of the vibration film 16 within a certain range. Specifically, it is possible to maintain the pressure in the space 101 between the base material 19 and the vibration film 16, thereby keeping the displacement of the vibration film 16 within a certain range by satisfying at least one of the following conditions: the total area of the opening surface 19D of the opening 19*a* facing the space 101 is 5% or less than the total area of the entire region of the main surface 16A of the vibration film 16 facing the space 101, or the total area of the opening surface 19D of the opening 19*a* facing the space 101 is 0.9 $mm^2$ or less.

With such a configuration, it is possible to provide a transducer with a good accuracy, for the displacement of a vibration film due to a drive voltage.

The transducer according to the present embodiment is not limited to the configuration described above and can be changed in various ways. Some modifications of the transducer according to the present embodiment will be described below.

<First Modification>

Figure 3:
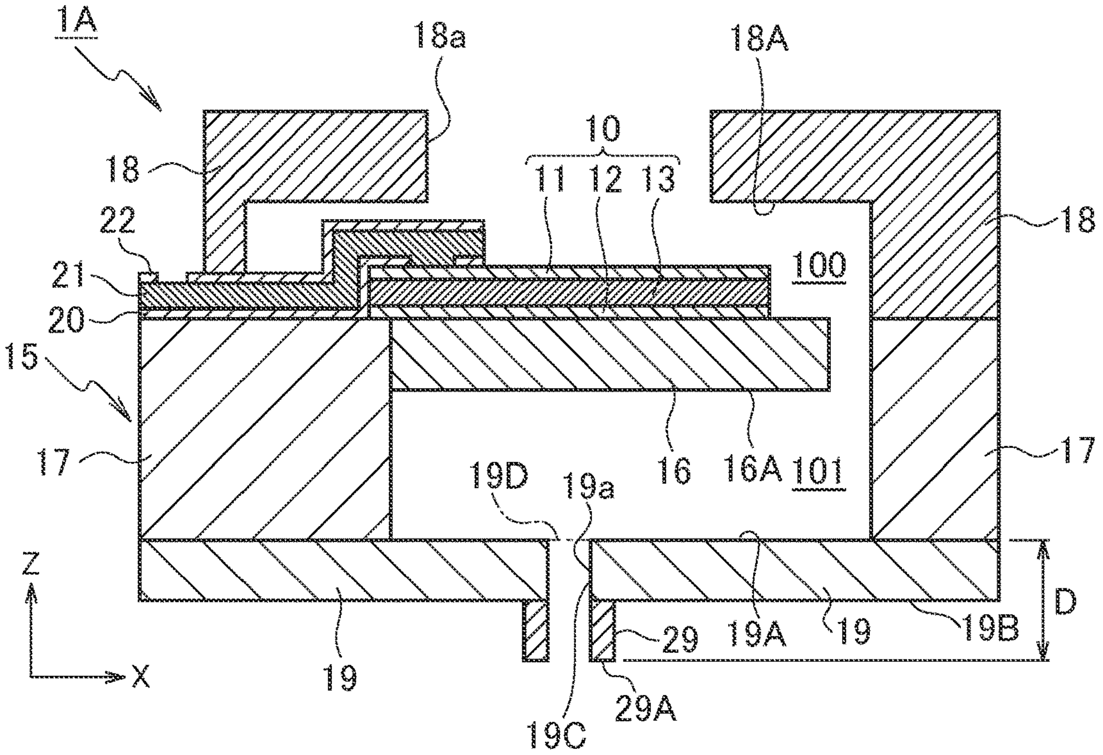
FIG. 3 is a cross-sectional view of a transducer according to a first modification of the first embodiment in an X direction.
Figure 4:
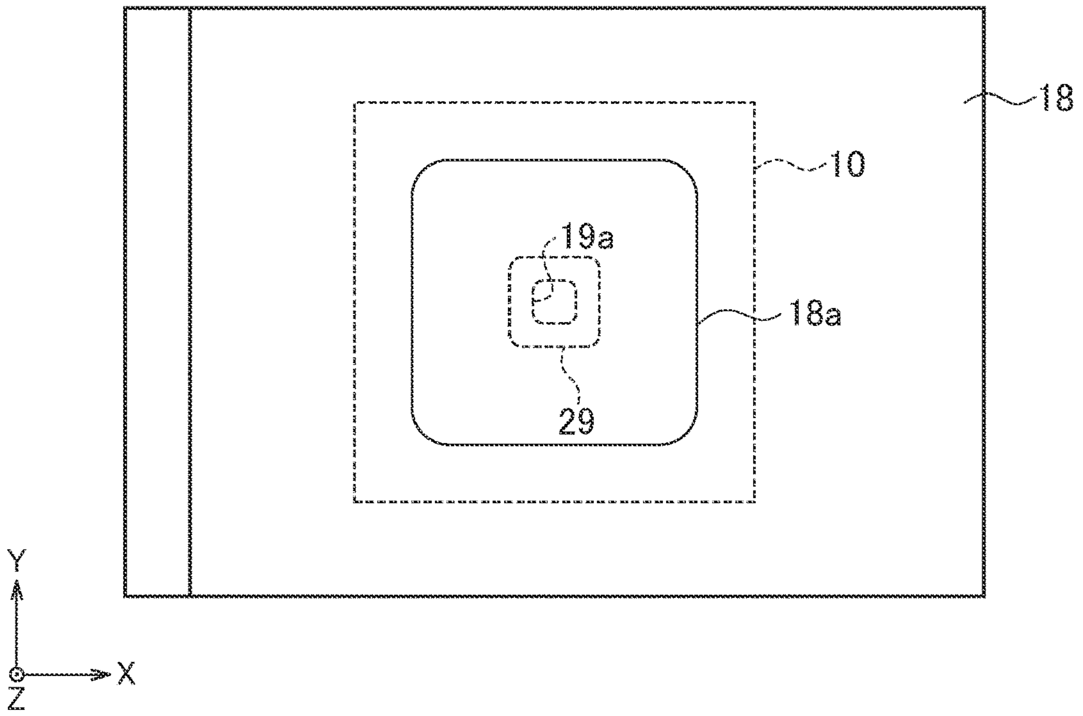
FIG. 4 is a top view of the transducer according to the first modification of the first embodiment.

The configuration of a transducer 1A according to the first modification will be described with reference to FIGS. 3 and 4. FIG. 3 is a cross-sectional view of the transducer 1A in the X direction. FIG. 4 is a top view of the transducer 1A. The transducer 1A according to the first modification differs from the transducer 1 illustrated in FIGS. 1 and 2 in that an opening member 29 surrounding the opening 19*a* is newly provided. In the first modification, the matters common to those of the transducer 1 illustrated in FIGS. 1 and 2 are covered by the aforementioned description, and the matters different from those of the transducer 1 will be described below in detail.

The opening member 29 has a cylindrical shape, and surrounds the opening 19*a* in the main surface 19B of the base material 19 arranged on the opposite side of the opposed surface 19A. In the normal direction of the opposed surface 19A (Z direction), the distance D between the opposed surface 19A and a main surface 29A of the opening member 29 arranged on the opposite side of the main surface in contact with the base material 19 is preferably longer than the diameter of the circle when the total area of the opening surface 19D of the opening 19*a* facing the space 101 is converted into the area of the circle. By adopting such a configuration, the distance D increases by the length of the opening member 29 in the Z direction, and the flow of air flowing in the opening 19*a* and the cylindrical opening member 29 can be reduced. Accordingly, it is possible to maintain the pressure in the space 101, thereby keeping the displacement of the vibration film 16 within a certain range.

The opening member 29 may be made of a soft material such as resin, for example, and by using such a material, the opening member 29 expands and contracts due to a change of the air pressure in the space 101, and thus the volume of the space 101 and air flow in the space 101 can be changed dynamically. Accordingly, it is possible to appropriately adjust the volume of the space 101 and air flow in the space 101, thereby displacing the vibration film 16.

The opening member 29 may be integrally formed with the base material 19. It is preferable that the opening member 29 and the base material 19 are integrally formed using a soft material or the like because the process of forming the transducer can be reduced.

According to the first modification, it is possible to provide a transducer with a better accuracy, for the displacement of a vibration film due to a drive voltage.

<Second Modification>

Figure 5:
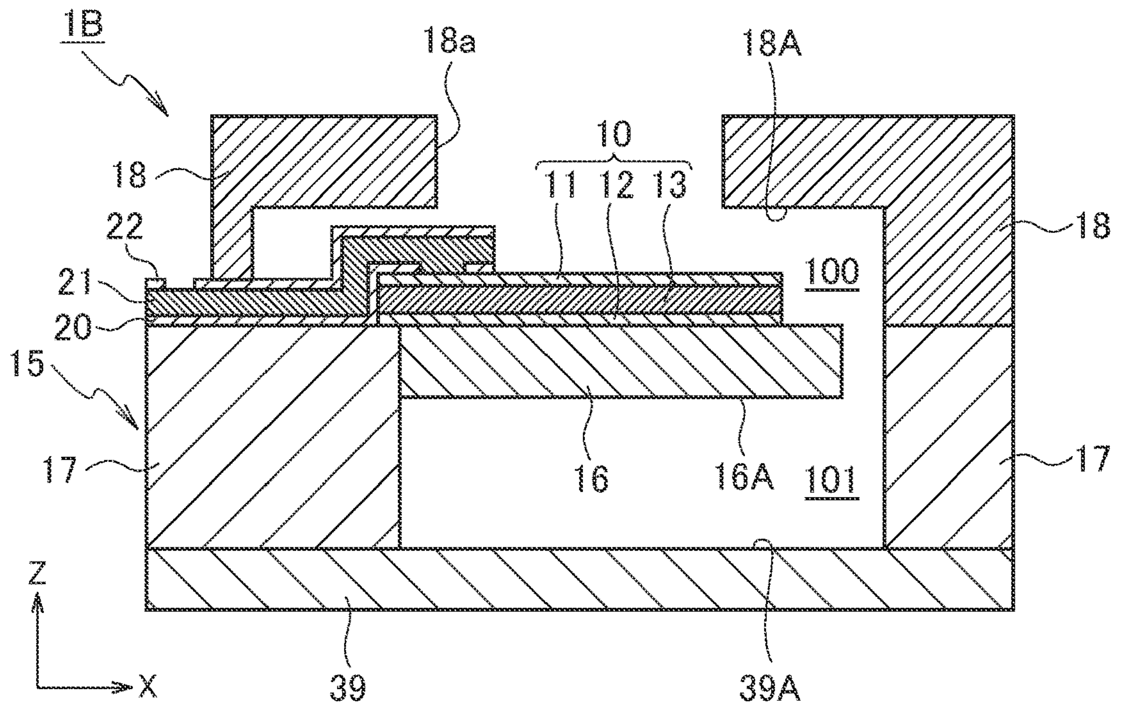
FIG. 5 is a cross-sectional view of a transducer according to a second modification of the first embodiment in an X direction.
Figure 6:
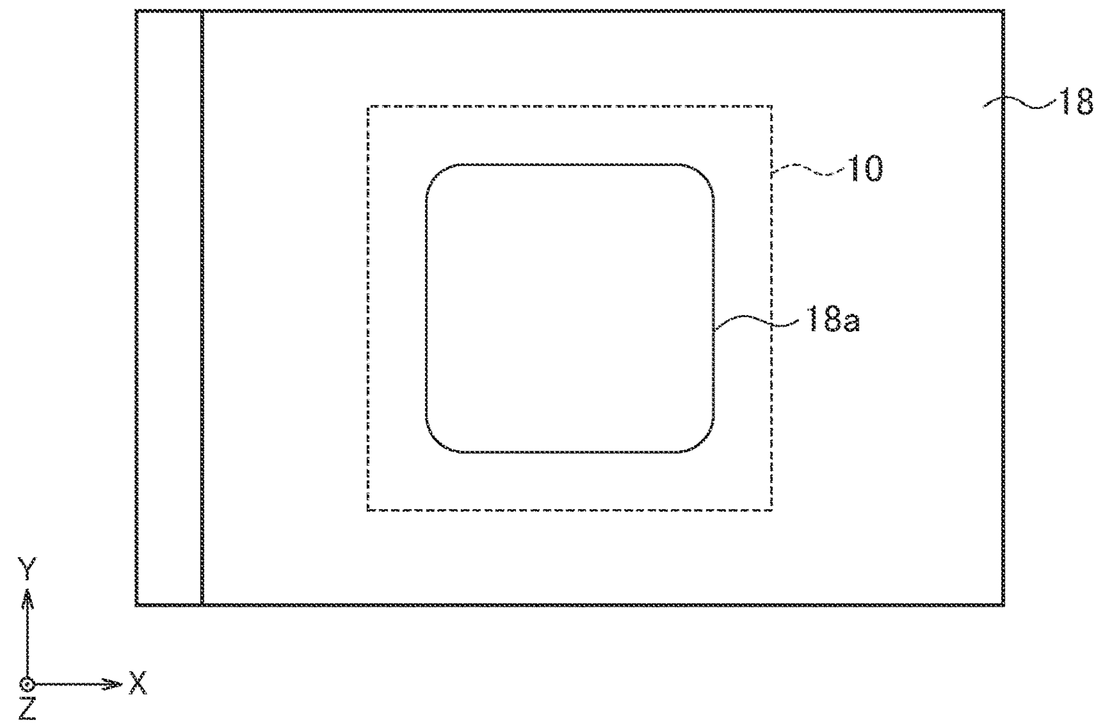
FIG. 6 is a top view of the transducer according to the second modification of the first embodiment.

The configuration of a transducer 1B according to the second modification will be described with reference to FIGS. 5 and 6. FIG. 5 is a cross-sectional view of the transducer 1B in the X direction. FIG. 6 is a top view of the transducer 1B. The transducer 1B according to the second modification differs from the transducer 1 illustrated in FIGS. 1 and 2 in that a base material 39 having no opening is used instead of the base material 19. In the second modification, the matters common to those of the transducer 1 illustrated in FIGS. 1 and 2 are covered by the aforementioned description, and the matters different from those of the transducer 1 will be described below in detail.

The base material 39 is the same as the base material 19 except for the description of the opening 19*a* of the base material 19 illustrated in FIG. 1. The base material 39 has an opposed surface 39A opposed to the vibration film 16. The base material 39 is also in contact with the film support portion 17 in the opposed surface 39A. In the space 101 surrounded by the vibration film 16, the film support portion 17, and the base material 39, air vibrates due to the displacement of the vibration film 16, and air flows to the outside of the transducer 1B through the space 100. The base material 39 is composed of, for example, silicon (Si) and a printed board such as a printed wiring board (PWB) and a printed circuit board (PCB).

In the normal direction of the opposed surface 39A (Z direction), the entire region of the opposed surface 39A overlaps the vibration film 16. It is preferable that the volume of the space 101 is the product of 1.1 times the projected area of the vibration film 16 and 1 to 100 times the amount of displacement by which the vibration film 16 is displaced in the film thickness direction, because the pressure in the space 101 is maintained within a certain range, thereby making it possible to ensure appropriate air flow.

In addition, the base material 39 may be made of a soft material such as resin, for example, and by using such a material, the base material 39 expands and contracts due to a change in the air pressure in the space 101, and thus the volume of the space 101 and air flow in the space 101 can be dynamically changed. Accordingly, it is possible to appropriately adjust the volume of the space 101 and air flow in the space 101, thereby displacing the vibration film 16.

According to the second modification, it is possible to provide a transducer with a better accuracy, for the displacement of a vibration film due to a drive voltage.

<Third Modification>

Figure 7:
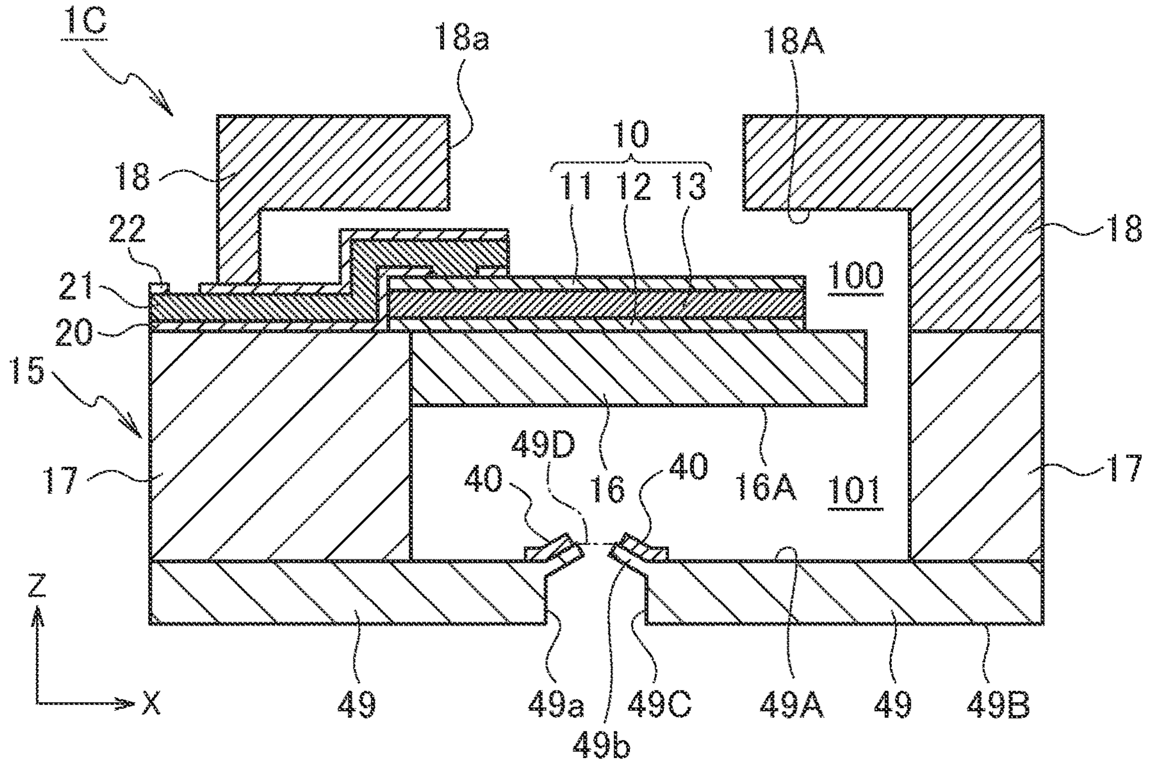
FIG. 7 is a cross-sectional view of a transducer according to a third modification of the first embodiment in an X direction.

The configuration of a transducer 1C according to the third modification will be described with reference to FIG. 7. FIG. 7 is a cross-sectional view of the transducer 1C in the X direction. The transducer 1C according to the third modification differs from the transducer 1 illustrated in FIGS. 1 and 2 in that a base material 49 is used instead of the base material 19. An opposed surface 49A opposed to the vibration film 16 of the base material 49 is provided with an opening 49*a* that penetrates the base material 49 and faces the space 101. A protrusion-like opening valve 49*b* is connected to a side wall surface 49C of the base material 49. In the third modification, the matters common to those of the transducer 1 illustrated in FIGS. 1 and 2 are covered by the aforementioned description, and the matters different from those of the transducer 1 will be described below in detail.

The base material 49 is the same as the base material 19 or the base material 39 except for the description of the protrusion-like opening valve 49*b* which will described later. The base material 49 has the opposed surface 49A opposed to the vibration film 16, a main surface 49B arranged on the opposite side of the opposed surface 49A, and the side wall surface 49C between the opposed surface 49A and the main surface 49B. The base material 49 is also in contact with the film support portion 17 in the opposed surface 49A. The opposed surface 49A is provided with an opening 49*a* that penetrates the base material 49 and faces the space 101. The opposed surface 49A also includes an opening surface 49D of the opening 49*a* that faces the space 101.

Further, the base material 49 has the protrusion-like opening valve 49*b* that is connected to the side wall surface 49C of the opening 49*a* in the normal direction of the opposed surface 49A (Z direction). The opening valve 49*b* has a cylindrical shape surrounding the opening 49*a*, but is not limited thereto.

Further, a piezoelectric element 40 is provided on the opening valve 49*b*. The piezoelectric element 40 has a function of changing the area of the opening surface 49D of the opening 49*a* by deforming the opening valve 49*b*. Specifically, by applying a drive voltage to a pair of electrodes included in the piezoelectric element 40, the opening valve 49*b* is displaced upward or downward together with the piezoelectric element 40, and the area of the opening surface 49D of the opening 49*a* changes due to the displacement. For example, the piezoelectric element 40 may have a configuration similar to that of the piezoelectric element 10 described above. By using the base material 49 having the opening valve 49*b* and the piezoelectric element 40, the area of the opening surface 49D can be changed to dynamically change the volume of the space 101 and air flow in the space 101. Accordingly, it is possible to appropriately adjust the volume of the space 101 and air flow in the space 101, thereby displacing the vibration film 16.

According to the third modification, it is possible to provide a transducer with a better accuracy, for the displacement of a vibration film due to a drive voltage.

<Fourth Modification>

Figure 8:
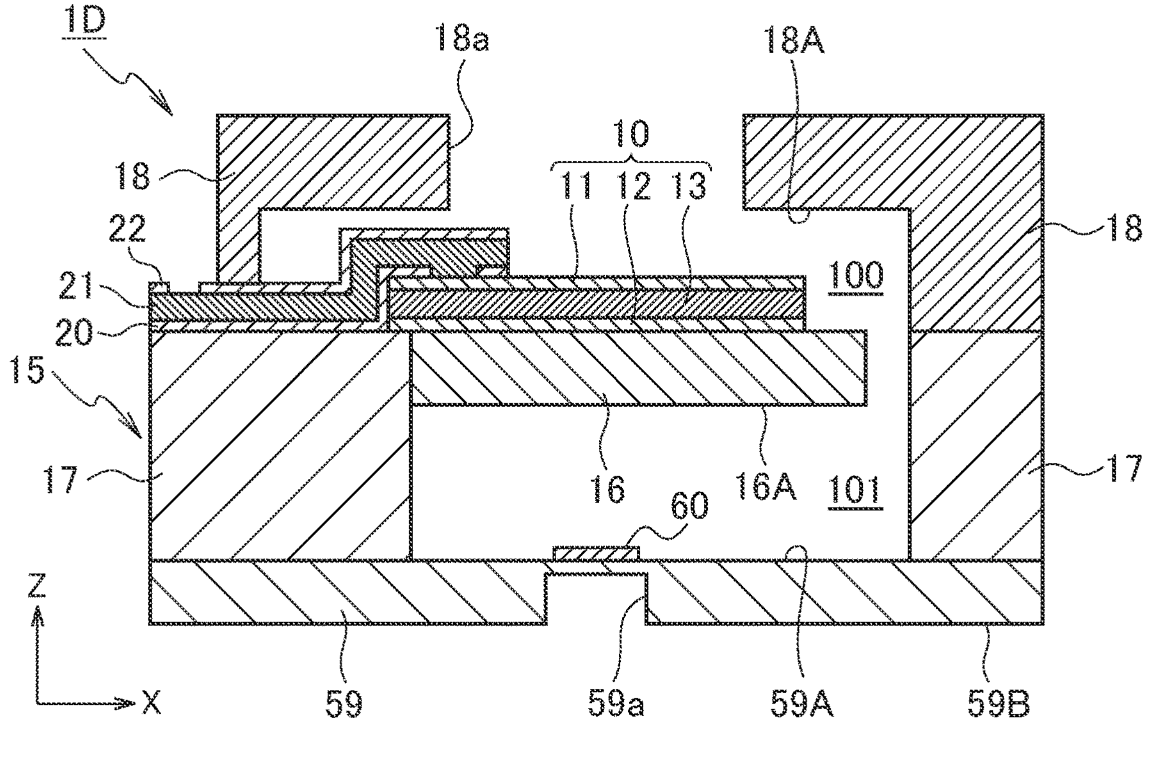
FIG. 8 is a cross-sectional view of a transducer according to a fourth modification of the first embodiment in an X direction.

The configuration of a transducer 1D according to the fourth modification will be described with reference to FIG. 8. FIG. 8 is a cross-sectional view of the transducer 1D in the X direction. The transducer 1D according to the fourth modification differs from the transducer 1 illustrated in FIGS. 1 and 2 in that a base material 59 having a recess 59*a* is used instead of the base material 19. In the fourth modification, the matters common to those of the transducer 1 illustrated in FIGS. 1 and 2 are covered by the aforementioned description, and the matters different from those of the transducer 1 will be described below in detail.

The base material 59 is the same as the base material 19 or the base material 39 except for the description of the recess 59*a* which will described later. The base material 59 has an opposed surface 59A opposed to the vibration film 16, and a main surface 59B arranged on the opposite side of the opposed surface 59A. The base material 59 is also in contact with the film support portion 17 in the opposed surface 59A. The base material 59 has the recess 59*a* at the main surface 59B side. A piezoelectric element 60 is further provided on the opposed surface 59A overlapping the recess 59*a*. The piezoelectric element 60 has a function of changing the volume of the space 101 by deforming the base material 59 (more specifically, the region where the recess 59*a* is positioned). Specifically, by applying a drive voltage to a pair of electrodes included in the piezoelectric element 60, the base material 59 (more specifically, the region where the recessed portion 59*a* is positioned) is displaced upward or downward together with the piezoelectric element 60, and the volume of the space 101 changes due to the displacement. For example, the piezoelectric element 60 may have a configuration similar to that of the piezoelectric element 10 described above. By using the base material 59 having the recess 59*a* and the piezoelectric element 60, the base material 59 (more specifically, the region where the recess 59*a* is positioned) can be deformed to dynamically change the volume of the space 101 and air flow in the space 101. Accordingly, it is possible to appropriately the volume of the space 101 and air flow in the space 101, thereby displacing the vibration film 16.

According to the fourth modification, it is possible to provide a transducer with a better accuracy, for the displacement of a vibration film due to a drive voltage.

<Fifth Modification>

Figure 9:
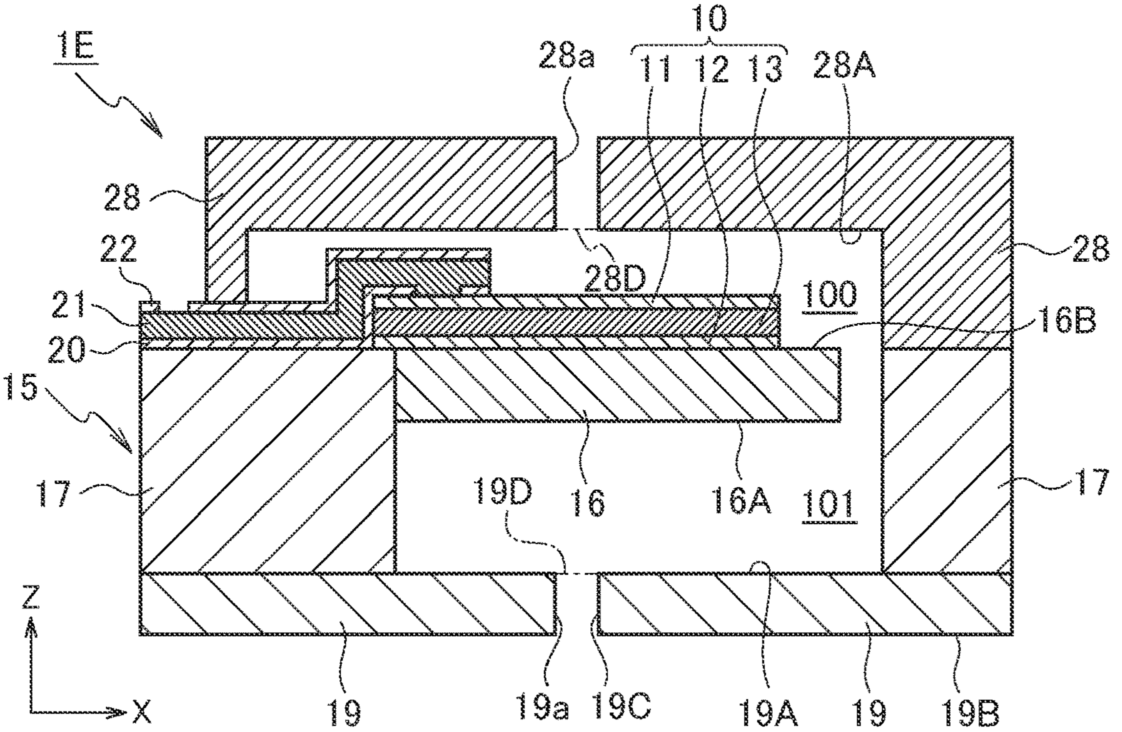
FIG. 9 is a cross-sectional view of a transducer according to a fifth modification of the first embodiment in an X direction.
Figure 10:
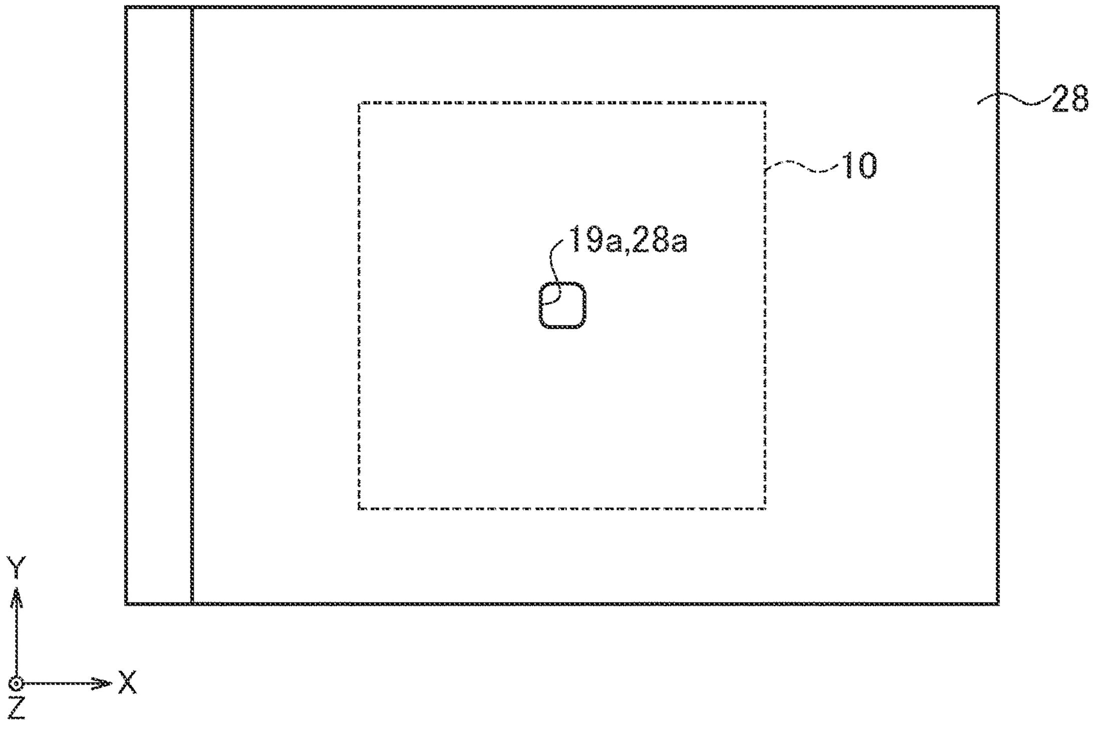
FIG. 10 is a top view of the transducer according to the fifth modification of the first embodiment.

The configuration of a transducer 1E according to the fifth modification will be described with reference to FIGS. 9 and 10. FIG. 9 is a cross-sectional view of the transducer 1E in the X direction. FIG. 10 is a top view of the transducer 1E. The transducer 1E according to the fifth modification differs from the transducer 1 illustrated in FIGS. 1 and 2 in that a contact member 28 is used instead of the contact member 18. In the fifth modification, the matters common to those of the transducer 1 illustrated in FIGS. 1 and 2 are covered by the aforementioned description, and the matters different from those of the transducer 1 will be described below in detail.

The contact member 28 is formed on the insulating film 22 and on the film support portion 17. The contact member 28 is arranged so as to be opposed to the vibration film 16. The contact member 28 has the same function as the base material 19 described above. Specifically, the resonance of the vibration film 16 can be attenuated by adjusting the total area of an opening surface 28D of the opening 28*a* of the contact member 28, which faces the space 100. That is, the contact member 28 has a function of controlling the displacement of the vibration film 16. Further, when the vibration film 16 is displaced toward the space 100 side, the contact member 28 controls the displacement of the vibration film 16 by the vibration film 16 or the piezoelectric element 10 arranged on the vibration film 16 coming into contact with the contact member 28.

The distance between a contact surface 28A of the contact member 28 with which the vibration film 16 comes into contact and the vibration film 16 is set, based on the displacement of the vibration film 16 acquired when a rated voltage is applied to the piezoelectric element 10 (hereinafter referred to as "maximum displacement"). That is, the contact surface 28A of the contact member 28 is set such that the vibration film 16 or the piezoelectric element 10 (a stack of these ones is also called a vibration body) comes into contact with the contact surface 28A when the displacement larger than the maximum displacement occurs. Thus, the vibration film 16 or the piezoelectric element 10 comes into contact with the contact surface 28A when a large displacement exceeding the maximum displacement occurs in the vibration body due to an impact or the like, without preventing the normal displacement of the vibration film 16 caused by the piezoelectric element 10.

The shape of the contact surface 28A is formed based on the displacement shape when the vibration film 16 is displaced. Thus, when the vibration film 16 comes into contact with the contact surface 28A, the contact surface 28A comes into contact with the vibration film 16 with the surface. For example, the contact surface 28A of the contact member 28 arranged in the space 100 may have a hemispherical shape that is curved upward. The contact member 28 is composed of, for example, silicon (Si).

The contact surface 28A is provided with an opening 28*a* that penetrates the contact member 28 and faces the space 100. The contact surface 28A also includes the opening surface 28D of the opening 28*a* that faces the space 100. In the space 100 between the vibration film 16 and the contact member 28, air vibrates due to the displacement of the vibration film 16, and air flows to the outside of the transducer 1E through the opening 28*a*. When air flows in the space 100, the distance (clearance) between the vibration film 16 and the contact surface 28A of the contact member 28 may be as long as the vibration film 16 can be displaced up and down, and is preferably small. For example, the clearance is 5 to 30 μm. By reducing the clearance, an air leakage can be suppressed, and thus air can be vibrated efficiently. As illustrated in FIG. 10, it is preferable that the opening 28*a* has rounded ends. Since the opening 28*a* has rounded ends, the concentration of stress at the ends can be alleviated.

In the contact surface 28A, when the total area of the opening surface 28D of the opening 28*a* facing the space 100 is 5% or less, more preferably 4% or less, and still more preferably 3% or less than the total area of the entire region of the main surface 16B of the vibration film 16 facing the space 100 (in other words, the total area of the contact surface 28A of the contact member 28, excluding the opening surface 28D, is 95% or more, more preferably 96% or more, and still more preferably 97% or more than the total area of the entire region of the main surface 16B of the vibration film 16 facing the space 100), the pressure in the space 100 is maintained within a certain range, thereby making it possible to ensure appropriate air flow. Specifically, when the vibration film 16 alternately repeats the displacement of the vibration film 16 to the upper space 100 side and the displacement of the vibration film 16 to the lower space 101 side, the pressure in the space 100 gradually increases, and the resonance of the vibration film 16 can be attenuated by an increase in the pressure in the space 100, and the air flow in the space 100 is also adjusted. Since the air in the space 100 flows to the outside from the opening 28*a*, the pressure in the space 100 has a maximum value, and the maximum value is appropriately set by the displacement amount and shape of the vibration film 16, the volume of the space 100, or the like. For this reason, the displacement of the vibration film 16 can be kept within a certain range.

Further, when the total area of the opening surface 28D of the opening 28*a* facing the space 100 is 0.9 $mm^2$ or less, more preferably 0.7 $mm^2$ or less, and still more preferably 0.5 $mm^2$ or less, the pressure in the space 100 is maintained within a certain range, thereby making it possible to ensure appropriate air flow. Specifically, when the vibration film 16 alternately repeats the displacement of the vibration film 16 to the upper space 100 side and the displacement of the vibration film 16 to the lower space 101 side, the pressure in the space 100 gradually increases, and the resonance of the vibration film 16 can be attenuated by an increase in the pressure in the space 100, and the air flow in the space 100 is also adjusted. Therefore, the displacement of the vibration film 16 can be kept within a certain range.

According to the fifth modification, it is possible to provide a transducer with a better accuracy, for the displacement of a vibration film due to a drive voltage.

<Sixth Modification>

Figure 11:
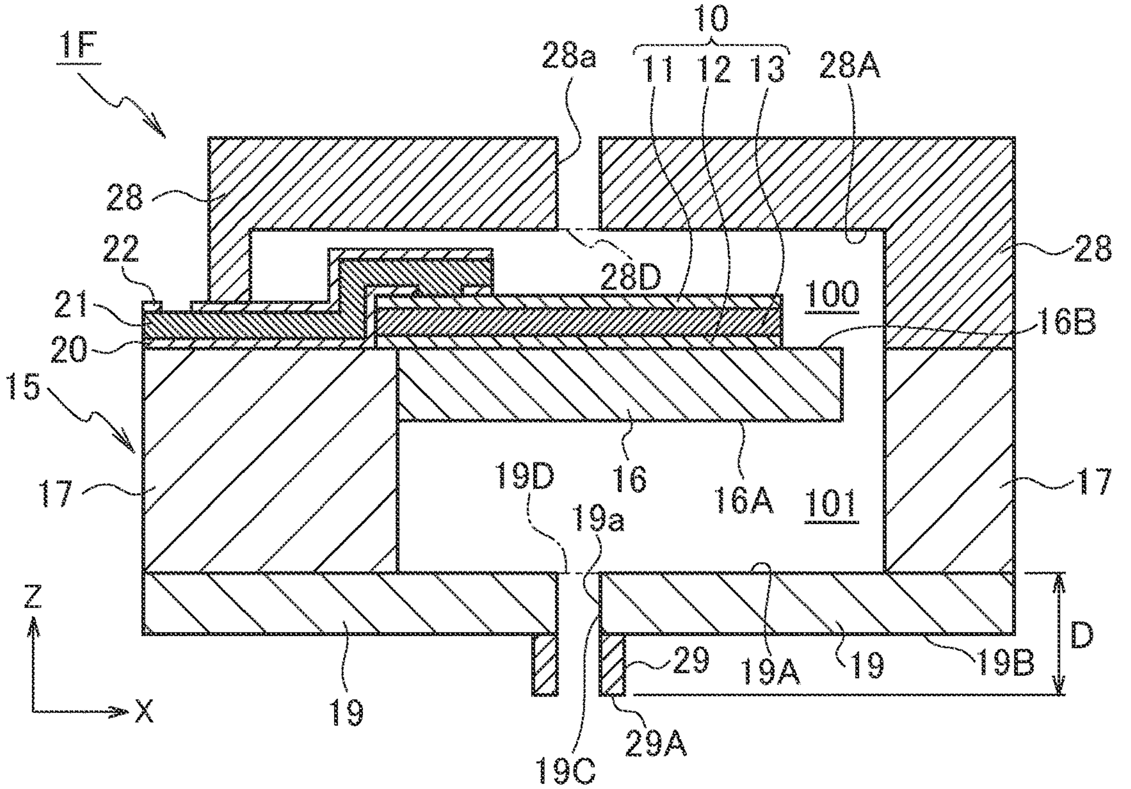
FIG. 11 is a cross-sectional view of a transducer according to a sixth modification of the first embodiment in an X direction.
Figure 12:
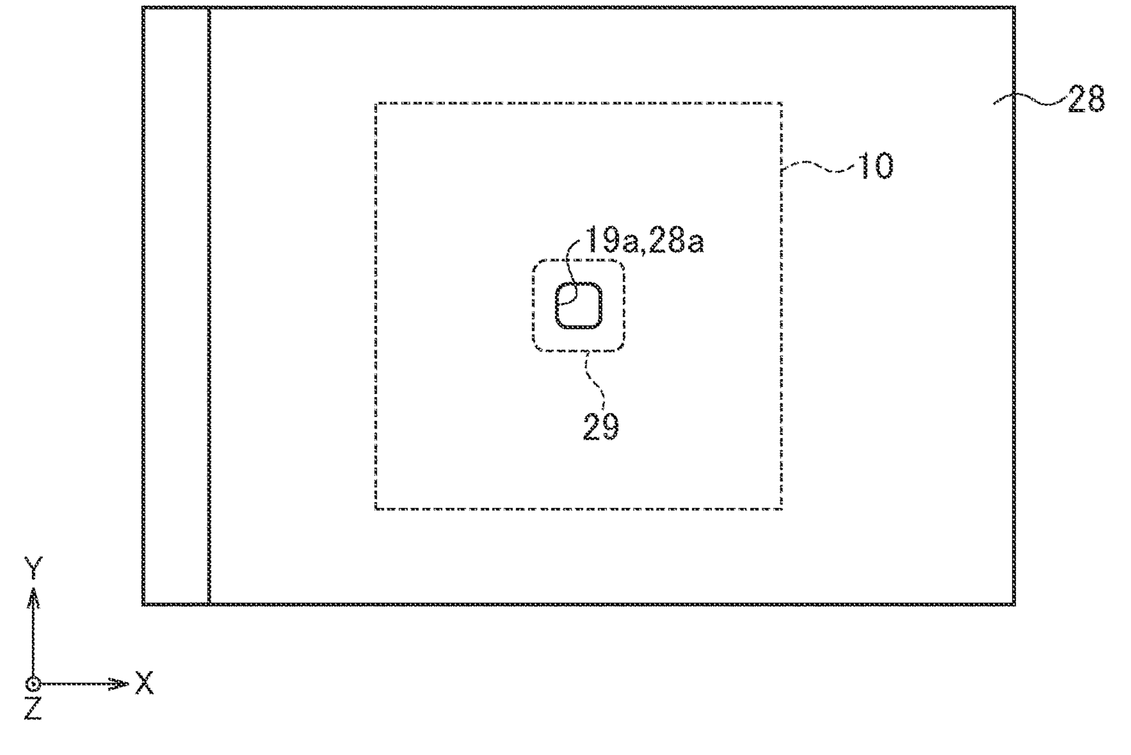
FIG. 12 is a top view of the transducer according to the sixth modification of the first embodiment.

The configuration of a transducer 1F according to the sixth modification will be described with reference to FIGS. 11 and 12. FIG. 11 is a cross-sectional view of the transducer 1F in the X direction. FIG. 12 is a top view of the transducer 1F. The transducer 1F according to the sixth modification differs from the transducer 1A illustrated in FIGS. 3 and 4 in that the contact member 28 is used instead of the contact member 18. In the sixth modification, the matters common to those of the transducer 1A illustrated in FIGS. 3 and 4 are covered by the aforementioned description, and the matters different from those of the transducer 1 will be described below in detail.

Similar to the transducer 1E in the fifth modification, the transducer 1F maintains the pressure in the space 100 between the contact member 28 and the vibration film 16 so as to keep the displacement of the vibration film 16 within a certain range. Specifically, it is possible to maintain the pressure in the space 100 between the contact member 28 and the vibration film 16, thereby keeping the displacement of the vibration film 16 within a certain range by satisfying at least one of the following conditions: the total area of the opening surface 28D of the opening 28*a* facing the space 100 is 5% or less than the total area of the entire region of the main surface 16B of the vibration film 16 facing the space 100, or the total area of the opening surface 28D of the opening 28*a* facing the space 100 is 0.9 $mm^2$ or less.

According to the sixth modification, it is possible to provide a transducer with a better accuracy, for the displacement of a vibration film due to a drive voltage.

<Seventh Modification>

Figure 13:
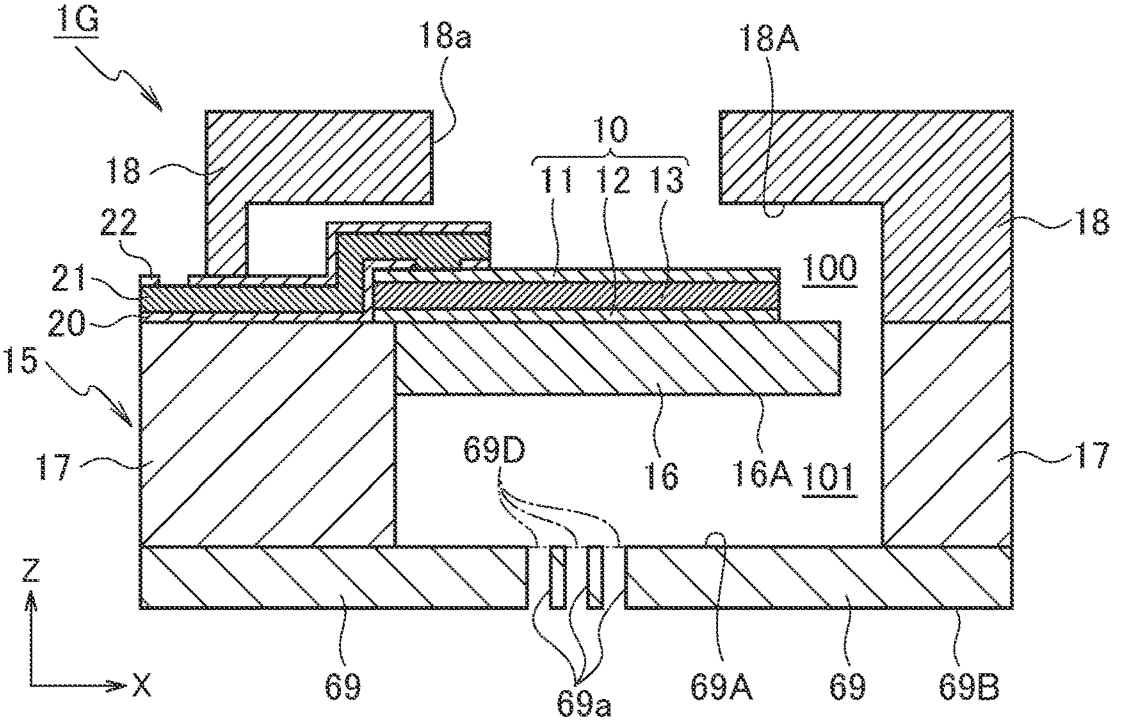
FIG. 13 is a cross-sectional view of a transducer according to a seventh modification of the first embodiment in an X direction.
Figure 14:
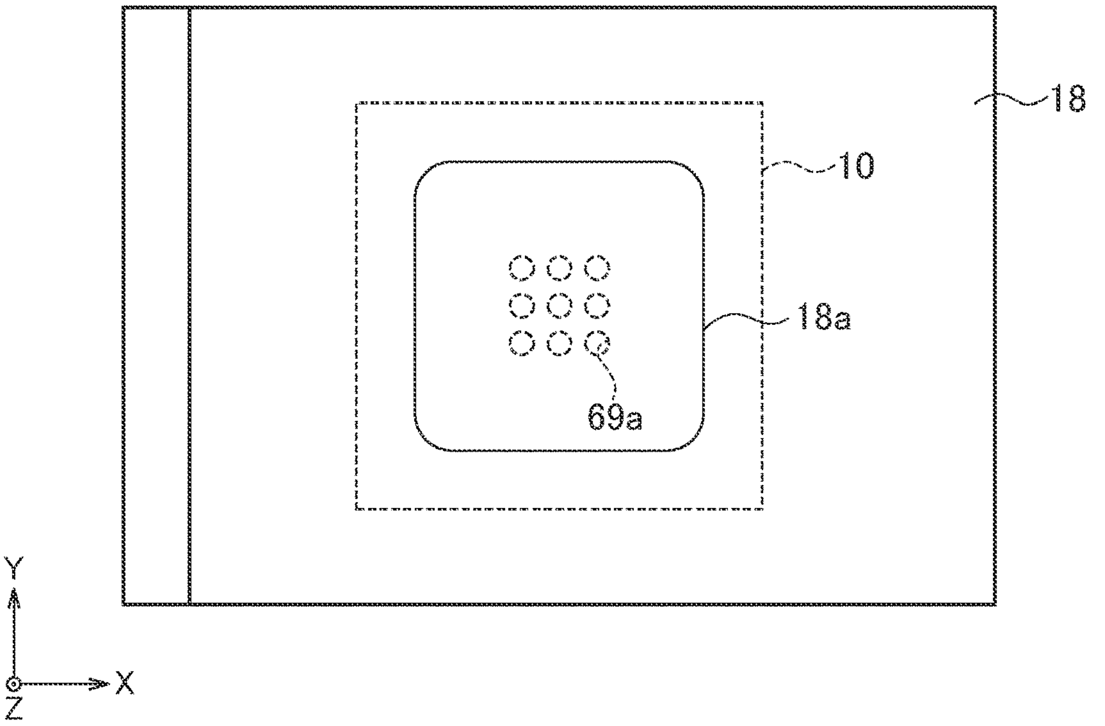
FIG. 14 is a top view of the transducer according to the seventh modification of the first embodiment.

The configuration of a transducer 1G according to the seventh modification will be described with reference to FIGS. 13 and 14. FIG. 13 is a cross-sectional view of the transducer 1G in the X direction. FIG. 14 is a top view of the transducer 1G. The transducer 1G according to the seventh modification differs from the transducer 1 illustrated in FIGS. 1 and 2 in that a base material 69 having a plurality of openings 69*a* is used instead of the base material 19. In the seventh modification, the matters common to those of the transducer 1 illustrated in FIGS. 1 and 2 are covered by the aforementioned description, and the matters different from those of the transducer 1 will be described below in detail.

The base material 69 is the same as the base material 19 or the base material 39 except for the description of a plurality of openings 69*a* which will described later. The base material 69 has the opposed surface 69A opposed to the vibration film 16, and the main surface 69B arranged on the opposite side of the opposed surface 69A. The base material 69 is also in contact with the film support portion 17 in the opposed surface 69A. The opposed surface 69A is provided with a plurality of openings 69*a* that penetrate the base material 69 and face the space 101. The opposed surface 69A also includes a plurality of opening surfaces 69D of the openings 69*a* that face the space 101.

In the opposed surface 69A, when the total area of the plurality of opening surfaces 69D facing the space 101 is 5% or less, more preferably 4% or less, and still more preferably 3% or less than the total area of the entire region of the main surface 16A of the vibration film 16 facing the space 101 (in other words, the total area of the opposed surface 69A of the base material 69, excluding the opening surfaces 69D, is 95% or more, more preferably 96% or more, and still more preferably 97% or more than the total area of the entire region of the main surface 16A of the vibration film 16 facing the space 101), the pressure in the space 101 is maintained within a certain range, thereby making it possible to ensure appropriate air flow. Specifically, when the vibration film 16 alternately repeats the displacement of the vibration film 16 to the upper space 100 side and the displacement of the vibration film 16 to the lower space 101 side, the pressure in the space 101 gradually increases, and the resonance of the vibration film 16 can be attenuated by an increase in the pressure in the space 101, and the air flow in the space 101 is also adjusted. Since the air in the space 101 flows to the outside from the openings 69*a*, the pressure in the space 101 has a maximum value, and the maximum value is appropriately set by the displacement amount and shape of the vibration film 16, the volume of the space 101, or the like. For this reason, the displacement of the vibration film 16 can be kept within a certain range.

Further, when the total area of the plurality of opening surfaces 69D facing the space 101 is 0.9 $mm^2$ or less, more preferably 0.7 $mm^2$ or less, and still more preferably 0.5 $mm^2$ or less, the pressure in the space 101 is maintained within a certain range, thereby making it possible to ensure appropriate air flow. Specifically, when the vibration film 16 alternately repeats the displacement of the vibration film 16 to the upper space 100 side and the displacement of the vibration film 16 to the lower space 101 side, the pressure in the space 101 gradually increases, and the resonance of the vibration film 16 can be attenuated by an increase in the pressure in the space 101, and the air flow in the space 101 is also adjusted. Therefore, the displacement of the vibration film 16 can be kept within a certain range.

According to the seventh modification, it is possible to provide a transducer with a better accuracy, for the displacement of a vibration film due to a drive voltage.

<Eighth Modification>

Figure 15:
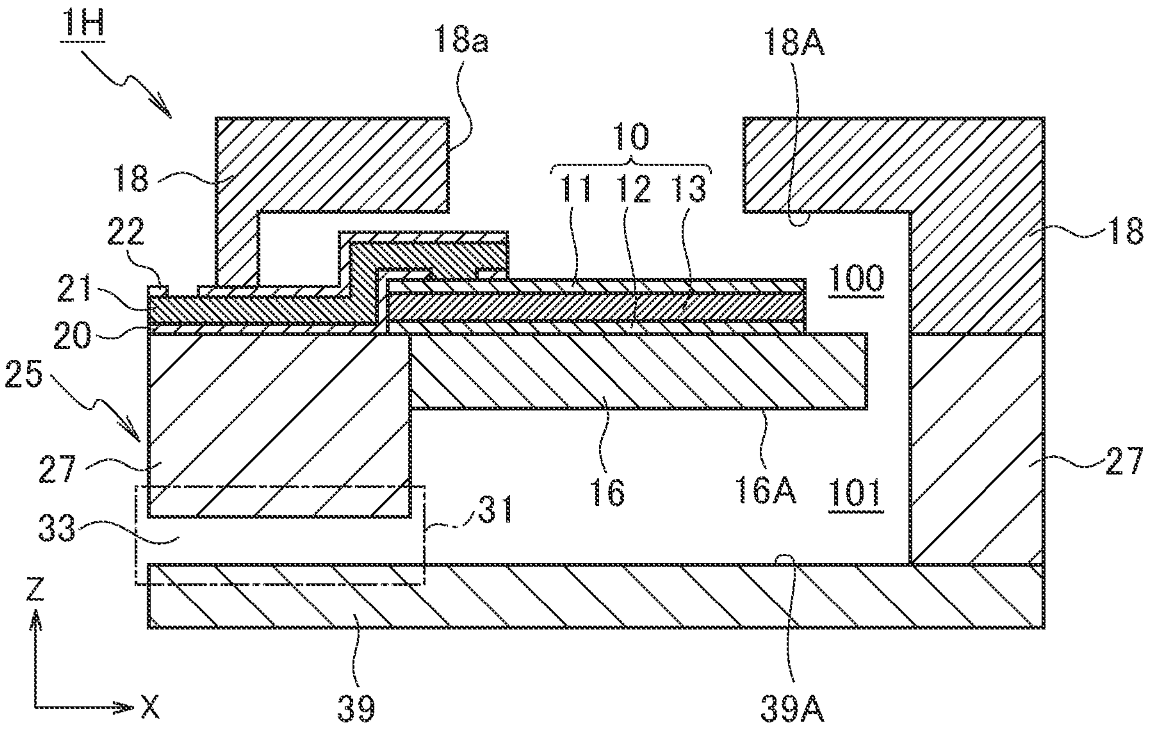
FIG. 15 is a cross-sectional view of a transducer according to an eighth modification of the first embodiment in an X direction.
Figure 16:
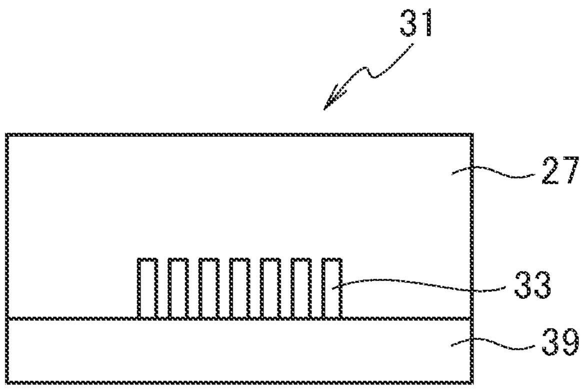
FIG. 16 is a cross-sectional view of slits in a film support portion in the transducer according to the eighth modification of the first embodiment when viewed from the air inflow/outflow side.

The configuration of a transducer 1H according to the eighth modification will be described with reference to FIGS. 15 and 16. FIG. 15 is a cross-sectional view of the transducer 1H in the X direction. FIG. 16 is a cross-sectional view of slits 33 of a film support portion 27 in a region 31 of the transducer 1H when viewed from the air inflow/outflow side. The transducer 1H according to the eighth modification differs from the transducer 1 illustrated in FIGS. 1 and 2 in that a base material 39 having no opening is used instead of the base material 19, and the film support portion 27 having the slits 33 is used. In the eighth modification, the matters common to those of the transducer 1 illustrated in FIGS. 1 and 2 are covered by the aforementioned description, and the matters different from those of the transducer 1 will be described below in detail.

The base material 39 is the same as the base material 19 except for the description of the opening 19*a* of the base material 19 illustrated in FIG. 1. The base material 39 has the opposed surface 39A opposed to the vibration film 16. The base material 39 is also in contact with the film support portion 27 in the opposed surface 39A.

The same material as that of the film support portion 17 can be used for the film support portion 27. That is, a film body 25 includes the vibration film 16 and the film support portion 27. Accordingly, the vibration film 16 and the film support portion 27 are integrally formed by etching the back surface side of the film body 25. In the eighth modification, the back surface side of the film body 25 is etched to form a groove serving as the space 101, and then a portion of the inner surface of the groove is etched to form the slits 33, thereby forming the film support portion 27. In other words, the step of etching the back surface side of the film body 25 to form the groove which serves as the space 101 and the step of etching the back surface side of the film body 25 to form the slits 33 are performed in separate steps, but the present modification is not limited thereto. For example, the slits 33 may be formed simultaneously with the step of etching the back surface side of the film body 25 to form the groove which serves as the space 101. At this time, the groove which serves as the space 101 has the same height as that of the slits 33. From the viewpoint of the number of steps and the cost, it is preferable to simultaneously form the groove, which serves as the space 101, and the slits 33 by using one photomask.

As illustrated in FIG. 16, the slits 33 provided in the film support portion 27 have a comb-like structure. Such a structure can prevent foreign matter (dust or liquid) from entering the internal space 101 from the outside. The slits 33 do not necessarily have a comb-tooth structure, and may have a lattice structure, for example, as long as they have a structure that can prevent foreign matter from entering the internal space 101 from the outside. In the film thickness direction (Z direction), it is preferable that the position of the slits 33 and the position of the opening of the insulating film 22 to which the wiring 21 and the electrode pad are connected do not overlap. This is because, when the wiring 21 and the electrode pad are electrically connected by die bonding using ultrasonic waves, if the slits 33 exist as cavities below the connection point between the wiring 21 and the electrode pad, the ultrasonic waves may not work well, and thus it may be difficult to connect the wire ball to the pad.

The slits 33 have the same function as the opening 19*a* described above. Specifically, the pressure in the space 101 is maintained by the slits 33 so as to keep the displacement of the vibration film 16 within a certain range, thereby making it possible to keep the displacement of the vibration film 16 within a certain range. Further, the transducer may include both the base material 19 having the opening 19*a* and the film support portion 27 having the slits 33. Furthermore, the opening 18*a* may not be provided in the contact member 18, and slits may be provided on the side surface of the contact member 18 instead of the opening 18*a*.

According to the eighth modification, it is possible to provide a transducer with a better accuracy, for the displacement of a vibration film due to a drive voltage.

<Electronic Device>

Figure 17A:
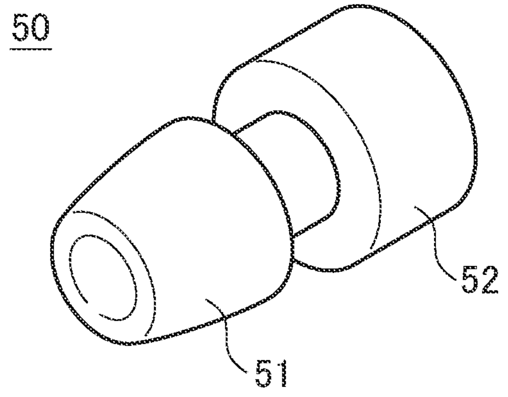
FIG. 17A is an overall view of an earphone, which is an example of an electronic device.

An electronic device according to the present embodiment will be described below. The electronic device according to the present embodiment includes a speaker unit, and a housing for housing the speaker unit. An example of the electronic device is an earphone. An earphone 50 illustrated in FIG. 17A has an earpiece 51 and a housing 52.

Figure 17B:
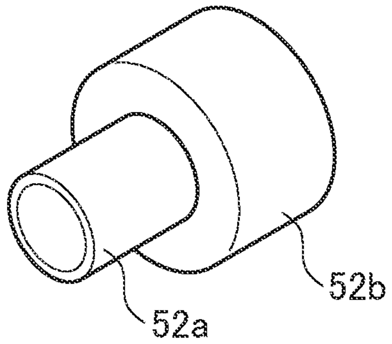
FIG. 17B is a diagram for explaining a housing of the earphone, which is as an example of the electronic device.

FIG. 17B is a diagram in which the earpiece 51 is removed from the earphone 50, and is a diagram for explaining the shape of the housing 52. The housing 52 has a bottomed cylindrical shape, and includes a cylindrical portion 52*a* and a bottom portion 52*b* which is in contact with the cylindrical portion 52*a*. The speaker unit is arranged in a portion of the cylindrical portion 52*a* and a portion of the bottom portion 52*b*. The arrangement of the housing 52 and the speaker unit (mounting of the speaker unit) will be described below.

(Mounting Example)

Figure 18:
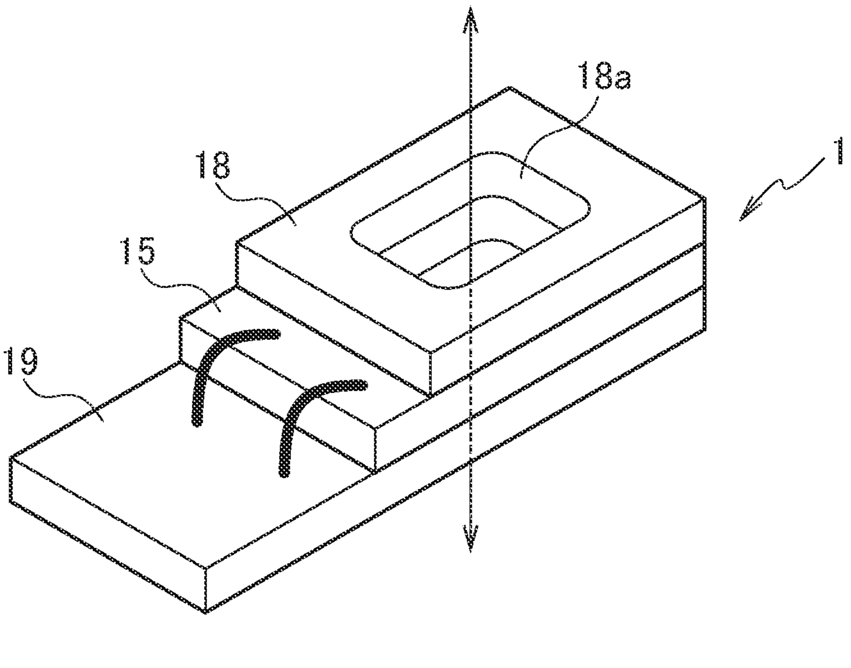
FIG. 18 is a diagram for explaining a configuration of a speaker unit in a mounting example.

As illustrated in FIG. 18, the speaker unit (transducer 1) has a structure in which the film body 15 and the contact member 18 are provided on the base material 19. The vent holes (specifically, the openings 18*a* and 19*a* illustrated in FIGS. 18 and 19) are provided in the film thickness direction (the direction indicated by the arrow in the figure) of the transducer 1 (the base material 19, the film body 15, and the contact member 18).

Figure 19:
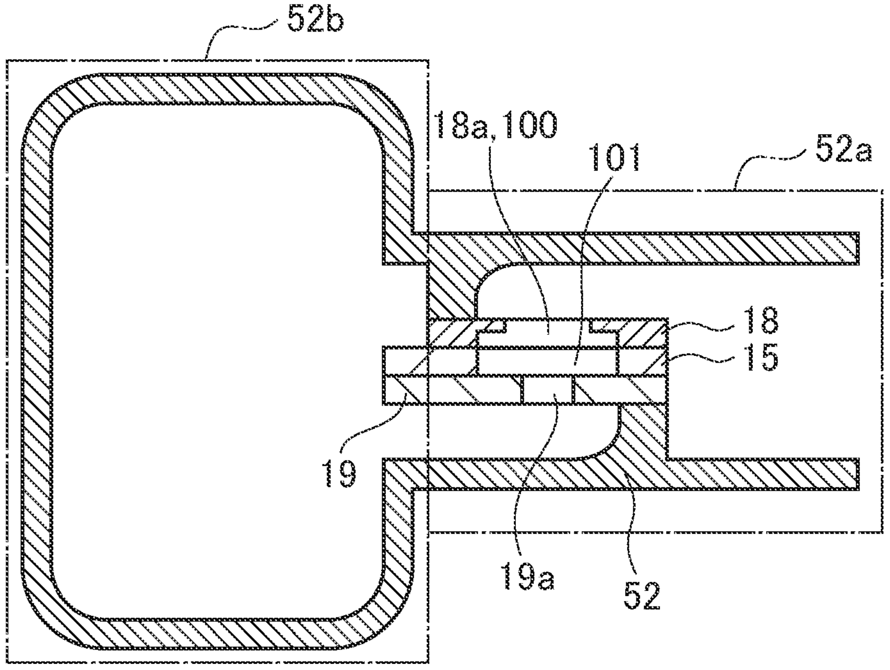
FIG. 19 is a cross-sectional view of the earphone in the mounting example.

FIG. 19 is a cross-sectional view of the earphone in which the transducer 1 is mounted in the housing 52. The base material 19 is arranged in a portion of the cylindrical portion 52*a* and a portion of the bottom portion 52*b*, and the film body 15 and the contact member 18 are provided on the base material 19. The base material 19 has the opening 19*a*, and the contact member 18 has the opening 18*a*. The film body 15 includes the vibration film 16 and the film support portion 17. The bottom portion 52*b* is separated from the cylindrical portion 52*a* with the transducer 1 therebetween, and the space of the bottom portion 52*b* communicates with the outside of the housing 52 through the openings 18*a* and 19*a*. The transducer 1 according to the present mounting example may be, for example, the transducer 1 according to the first embodiment illustrated in FIGS. 1 and 2, and the space of the bottom portion 52*b* communicates with the outside of the housing 52 through the opening 18*a*, the space 100, the space 101, and the opening 19*a*.

The airflow between the cylindrical portion 52*a* and the bottom portion 52*b* is blocked by the structure separating the cylindrical portion 52*a* and the bottom portion 52*b* through the transducer 1. As a result, the housing 52 can be used as a space for mounting other devices, batteries, and the like therein, thereby making it possible to reduce the size of the housing 52.

Other Embodiments

As described above, although some embodiments have been described, the statements and drawings forming part of the disclosure are exemplary and should not be understood as limiting. A variety of alternative embodiments, examples, and operational techniques will become apparent to those skilled in the art from this disclosure.

For example, the transducer may be applied to an application for receiving sound waves in addition to transmitting sound waves. The transducer is not limited to an application for sound waves, and may be applied to an application for transmitting or receiving ultrasonic waves.

The invention claimed is:

1. A transducer comprising:

a film support portion;

a vibration film that is connected to the film support portion and capable of displacing in a thickness direction;

a base material having an opposed surface that is opposed to the vibration film to have a space formed therebetween, the opposed surface having an opening therein, the opening penetrating the base material to be in communication with the space, a width of the opening being smaller than a width of the film support portion; and a first piezoelectric element that is provided with a pair of electrodes and a piezoelectric film sandwiched between the pair of electrodes, and is arranged on the vibration film, wherein the transducer maintains a pressure in the space so as to keep displacement of the vibration film within a certain range.

2. The transducer according to claim 1, wherein the vibration film has a main surface that faces the space; and an area of the opening in the opposed surface is 5% or less than an area of an entire region of the main surface of the vibration film.

3. The transducer according to claim 1, wherein an area of the opening in the opposed surface is 0.9 $mm^2$ or less.

4. The transducer according to claim 2, wherein the base material further has a main surface thereof on an opposite side of the opposed surface, and the base material further includes an opening member that surrounds the opening on the main surface thereof.

5. The transducer according to claim 4, wherein the opening member has a main surface thereof, the main surface of the opening member and the main surface of the base material being on opposite sides of the opening member, and in a normal direction of the opposed surface, a distance between the opposed surface and the main surface of the opening member is longer than a diameter of a circle that has a same area as the area of the opening in the opposed surface.

6. The transducer according to claim 4, wherein the opening member expands and contracts due to a change of air pressure in the space.

7. The transducer according to claim 4, wherein the opening member is made of resin.

8. The transducer according to claim 4, wherein the opening member is integrally formed with the base material.

9. The transducer according to claim 2, wherein the base material further includes a protrusion-like opening valve that is connected to a side wall surface of the opening in a normal direction of the opposed surface, and the area of the opening in the opposed surface is changeable by the opening valve.

10. The transducer according to claim 9, further including a second piezoelectric element on the opening valve, wherein the second piezoelectric element has a function of changing the area of the opening in the opposed surface by deforming the opening valve.

11. The transducer according to claim 1, wherein an entire region of the opposed surface overlaps the vibration film in a normal direction of the opposed surface, and a volume of the space is a product of 1.1 times a projected area of the vibration film and 1 to 100 times an amount of displacement by which the vibration film is displaced in the film thickness direction.

12. The transducer according to claim 11, wherein
a volume of the space is changed by displacement of the base material.

13. The transducer according to claim 11, further including a third piezoelectric element on the base material and in the space, wherein
the third piezoelectric element has a function of changing a volume of the space by deforming the base material.

14. The transducer according to claim 1, wherein
the base material expands and contracts due to a change of air pressure in the space.

15. The transducer according to claim 1, wherein
the base material is made of resin.

16. An electronic device comprising the transducer according to claim 1.

* * * * *